Dec. 16, 1930.  M. MOORE  1,784,971
LUGGAGE CARRIER FOR AUTOMOBILES
Filed March 16, 1928.  2 Sheets-Sheet 1
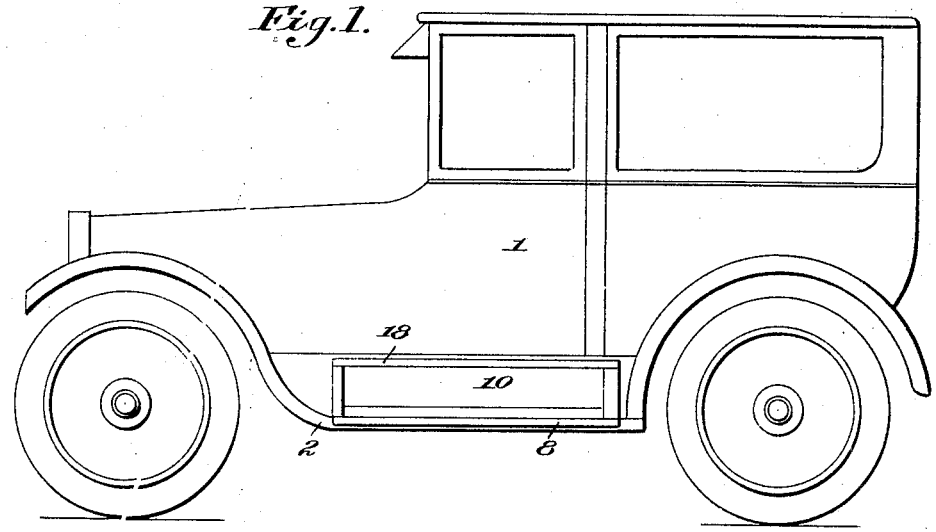
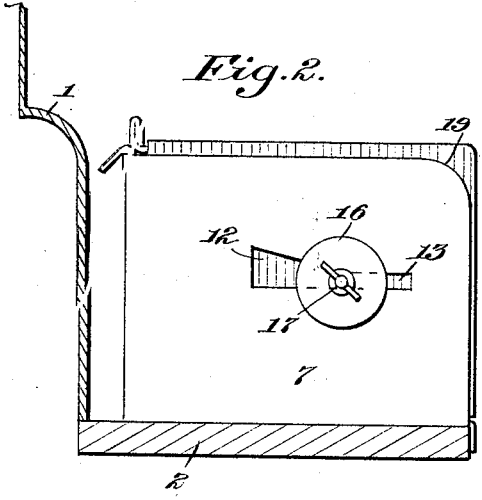
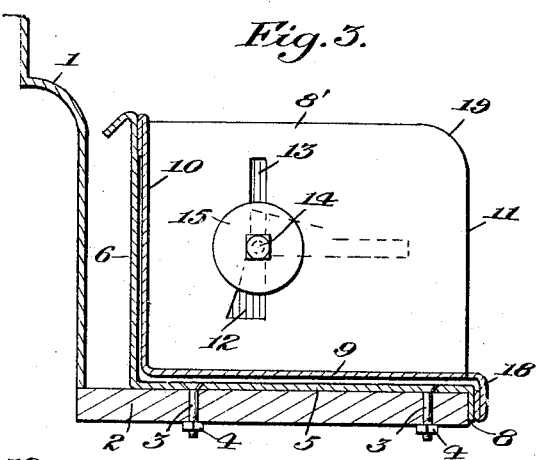
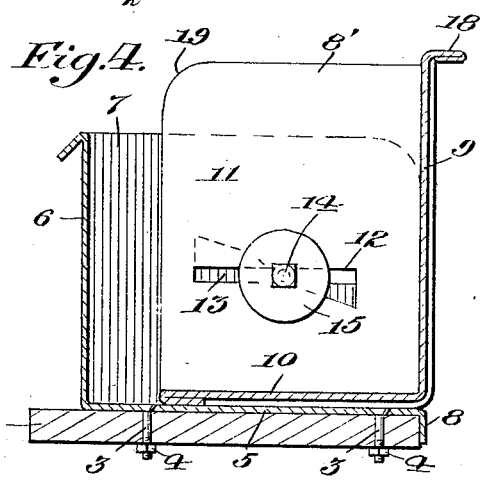
Inventor:
Merrill Moore,
by Jas. L. Skidmore
his Att'y.

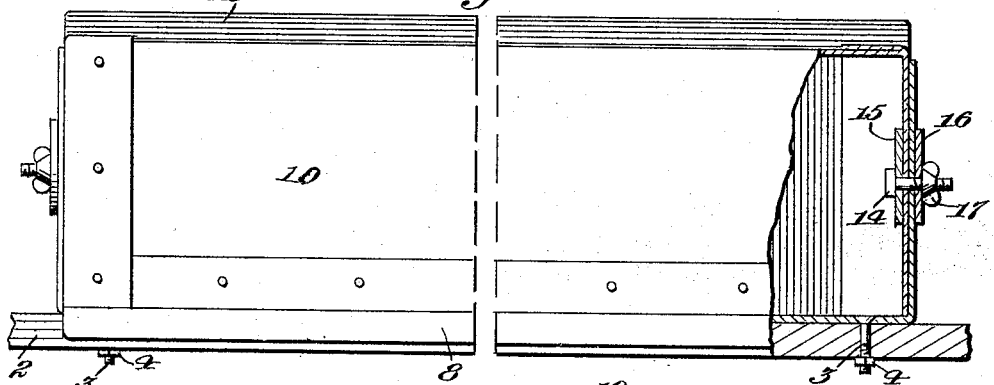
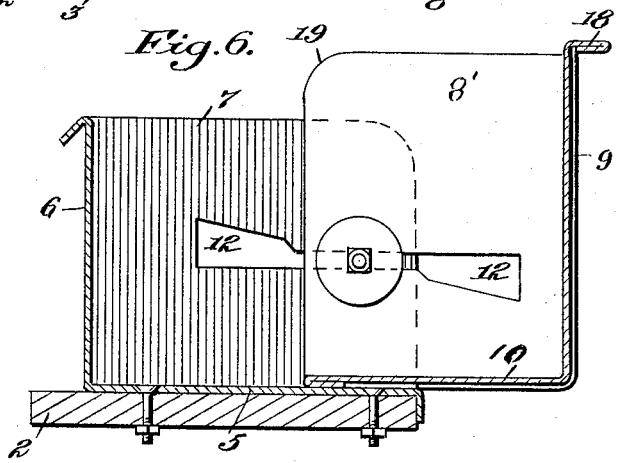
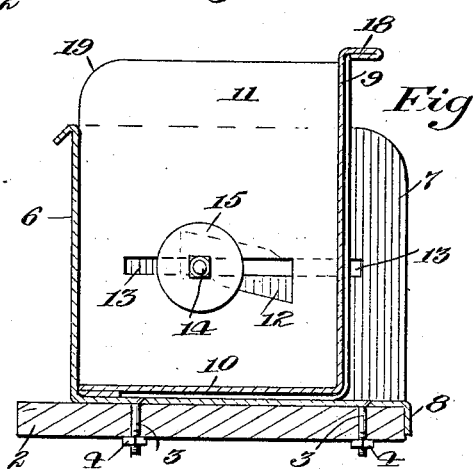

Patented Dec. 16, 1930

1,784,971

UNITED STATES PATENT OFFICE

MERRILL MOORE, OF CRESTON, IOWA

LUGGAGE CARRIER FOR AUTOMOBILES

Application filed March 16, 1928. Serial No. 262,096.

This invention relates to a novel luggage carrier adapted to be fixedly secured to the running board of an automobile or like vehicles.

The prime object of the invention is to provide a simple, economical, durable, adjustable, extensible and collapsible luggage carrier adapted to be mounted on a vehicle, for carrying various articles and types of luggage, secure against accidental displacement or loss, the carrier when not in use being adapted to be so folded or collapsed as to form a step secured to the running board.

Another object of the invention is to provide a device of the class described, forming a box-like structure when closed, consisting of two sheet metal members of a right-angle formation in cross-section, one of the said members constituting the bottom of said box being fixedly and removably secured to the running board.

A further object of the invention is to so construct and pivotally connect the members of the carrier at each end thereof, that it may be readily manipulated so as to be extended to its full width, narrowed to about half its extended width if desired, and folded or collapsed to form a step secured to the upper face of the running board, thereby constituting an unobstructed running board, as if the carrier was not fixedly attached thereto.

The foregoing and such other objects as may occur from the ensuing description are accomplished by the construction, arrangement, location and combination of the several parts hereinafter more fully described, illustrated in the accompanying drawings, and particularly pointed out in the claims appended hereto, it being understood that slight changes in the precise shape, proportions and minor details of the construction may be resorted to without departing from the spirit, or sacrificing any of the advantages of the invention.

In the accompanying drawings forming a part of this specification it will be seen that:—

Figure 1, is a side elevation of an automobile with the means embodying my invention secured to the running board thereof.

Figure 2 is an end elevation of the carrier in its closed position, showing the running board and a portion of the body of the automobile in section.

Figure 3 is a transverse sectional view taken through the central portion of the carrier, running board and a portion of the body of the automobile.

Figure 4 is a transverse sectional view of the carrier in its open position secured to the running board.

Figure 5 is a side elevation of the carrier showing one end portion broken away, and partly in section.

Figure 6 is a transverse section showing the carrier in the position assumed when in its fully extended position, and Figure 7 is a transverse section showing the carrier in the position assumed when in its completely narrowed or contracted condition.

In the embodiment of my invention as illustrated it will be seen that the numeral 1 designates the body portion of an automobile, and 2 the running board thereof. Fixedly and removably secured to the running board by suitable bolts 3 and securing nuts 4, is one integral member of the box-like luggage carrier forming the bottom 5, rear side 6, and outer end portions 7 thereof, said bottom being formed with a downwardly extended flange 8 adapted to rest in contact with the outer edge of the running board, and another similar member 8' forming the top 9, front wall or side 10, and inner end portions 11, when closed, is fitted within the first named member in close contact therewith, and each end of each member is provided with a slot formed therethrough having a widened opening 12 at one end thereof and a narrowed opening 13 at its opposite end, said slots being so formed through the end of each member that when the box is closed the end walls of the inner member will close the slot of the outer member and thus prevent the entrance of any foreign matter within the box.

The end portion or walls of each of said members are pivotally and removably secured together at each end thereof by a suitable bolt 14, carrying a washer 15 in contact with the inner face of the inner member, and a washer 16 in contact with the outer face of the outer member, and to the threaded end of each bolt 14 is attached a securing nut 17.

The inner member 8' is formed with an upright extension 18 throughout its length adapted to form a handle portion, whereby said member may be grasped by the hand when in its closed condition, and since each end portion is formed with a rounded corner 19, by imparting a rotary movement to the said member on its pivotal bolts, the said member is caused to assume the collapsed or folded position, such as is shown in Fig. 3, the open position shown in Fig. 4, the extended position shown in Fig. 6, and the narrowed or contracted position shown in Fig. 7.

The narrowed portion 13 of each slot is substantially the same width as the diameter of the bolts 14, hence when the box is extended as shown in Fig. 6, the bolts will be drawn within said narrowed portion and will serve to prevent the sagging of that portion of the box which extends beyond the running board.

To cause the box or carrier to assume the position shown in Fig. 3 simply push the bolts to 12 of the slots and turn the member 8'; to assume the position shown in Fig. 4 pull the member out and turn it without touching the bolts, and to close the box from Fig. 4 to Fig. 2 push the bolts to 12 and turn the member into its closed position.

It will be understood that my improved luggage carrier is formed of strong and durable sheet metal, preferably of the galvanized iron type, which may be coated or ornamented in any suitable or desirable manner to make it more attractive, and to conform with the appearance of the automobile to which it is attached, and that it may be secured to the running board at each side of the vehicle in such a manner as not to interfere with the doors of said vehicle. Further, that said carrier may be formed of any suitable or desirable dimensions consistent with the purposes thereof.

Having thus described my invention what I claim and desire to secure by Letters Patent is:—

1. A box-like luggage carrier fixedly secured to the running board of an automobile, comprising two members of right-angle shape in cross-section adjustably, extensibly and pivotally secured together at each end thereof, one member forming the top of said carrier being adapted to form a step upon the said running board when rotatably adjusted upon the other member.

2. A box-like luggage carrier fixedly secured to the running board of an automobile, comprising two metallic members formed of right-angle shape in cross-section and pivotally secured together at each end thereof, and means consisting of a slot formation through each end of each member, and a pivotal movable bolt fitted through each slot for adjustably and extensibly securing said members.

3. A box-like luggage carrier secured to the running board of an automobile, comprising two members, one member being fitted within the other, each end of each member having a horizontally disposed slot formed therethrough, and movable fastening means fitted through the slots, said means being adapted to adjustably and extensibly secure one member with relation to the other.

4. A box-like luggage carrier secured to the running board of an automobile, comprising two members, one member being disposed within the other, each end of each member having a horizontally disposed slot formed therethrough, and transversely movable means fitted through said slots of each member for securing the members together, said means being adapted to adjustably, extensibly and rotatably secure one member with relation to the other.

5. A box-like luggage carrier secured to the running board of an automobile, comprising two metallic members of right-angle shape in cross-section, one member being disposed with the other, and transversely movable means fitted through the ends of each member for securing the members together, said means being adapted to pivotally, adjustably and extensibly secure one member with relation to the other.

6. A box-like luggage carrier secured to the running board of an automobile, comprising two metallic members of right-angle shape in cross-section, and means fitted through the ends of each member for securing the members together, said means being adapted to pivotally, adjustably and extensibly secure one member with relation to the other.

7. A box-like luggage carrier fixedly secured to the running board of an automobile, comprising two metallic members of right-angle shape in cross-section, one of said members being disposed within the other, and movable means fitted through the ends of each member for securing the members together, said means being adapted to adjustably, extensibly, and rotatably secure one member with relation to the other.

MERRILL MOORE.